(12) United States Patent
Ditte et al.

(10) Patent No.: US 8,699,036 B2
(45) Date of Patent: Apr. 15, 2014

(54) DEVICE FOR OPTICALLY SCANNING AND MEASURING AN ENVIRONMENT

(75) Inventors: Andreas Ditte, Ludwigsburg (DE); Martin Ossig, Tamm (DE)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/699,001

(22) PCT Filed: Jul. 1, 2011

(86) PCT No.: PCT/EP2011/003264
§ 371 (c)(1),
(2), (4) Date: Nov. 20, 2012

(87) PCT Pub. No.: WO2012/013280
PCT Pub. Date: Feb. 2, 2012

(65) Prior Publication Data
US 2013/0070250 A1   Mar. 21, 2013

Related U.S. Application Data

(60) Provisional application No. 61/384,422, filed on Sep. 20, 2010.

(30) Foreign Application Priority Data

Jul. 29, 2010   (DE) .......................... 10 2010 033 561

(51) Int. Cl.
*G01B 11/24* (2006.01)
(52) U.S. Cl.
USPC ...... 356/614; 356/4.01; 356/5.01; 356/141.5; 358/505

(58) Field of Classification Search
USPC ............... 356/614–623, 445–448, 4.01, 5.01, 356/141.5; 701/23, 25, 33.7, 41, 48, 28; 358/505, 511, 474; 438/135
See application file for complete search history.

(56) References Cited

U.S. PATENT DOCUMENTS 3,830,567 A   8/1974 Riegl
3,899,145 A   8/1975 Stephenson
(Continued)

FOREIGN PATENT DOCUMENTS

AT          508635 A1   3/2011
AU     2005200937 A1   9/2006
(Continued)

OTHER PUBLICATIONS

International Preliminary Report on Patentability for International Application Serial No. PCT/EP2011/003261. International filing date Jul. 1, 2011. Date of Issuance Jan. 29, 2013.
(Continued)

*Primary Examiner* — Hoa Pham
(74) *Attorney, Agent, or Firm* — Cantor Colburn LLP (57) ABSTRACT

A device for optically scanning and measuring and environment, with a laser scanner, having a base and a measuring head which is rotatable relative to the base, with a light emitter, which emits an emission light beam, a light receiver which receives a reception light beam which is reflected by an object in the environment of the laser scanner or scattered otherwise, and a control and evaluation unit which, for a multitude of measuring points, determines at least the distance to the object, has a manually movable trolley, on which the laser scanner is mounted by means of its base and which can be taken from a resting state to a moving state, wherein the trolley has a path measuring device for measuring its path.

13 Claims, 3 Drawing Sheets

(56) References Cited

U.S. PATENT DOCUMENTS

| | | | |
|---|---|---|---|
| 3,945,729 A | 3/1976 | Rosen | |
| 4,733,961 A | 3/1988 | Mooney | |
| 4,736,218 A | 4/1988 | Kutman | |
| 4,984,881 A | 1/1991 | Osada et al. | |
| 5,155,684 A * | 10/1992 | Burke et al. | 701/25 |
| 5,218,427 A | 6/1993 | Koch | |
| 5,313,261 A | 5/1994 | Leatham et al. | |
| 5,329,347 A | 7/1994 | Wallace et al. | |
| 5,329,467 A | 7/1994 | Nagamune et al. | |
| 5,371,347 A | 12/1994 | Plesko | |
| 5,402,365 A | 3/1995 | Kozikaro et al. | |
| 5,446,846 A | 8/1995 | Lennartsson | |
| 5,517,297 A | 5/1996 | Stenton | |
| 5,629,756 A | 5/1997 | Kitajima | |
| 5,675,326 A * | 10/1997 | Juds et al. | 340/904 |
| 5,677,760 A | 10/1997 | Mikami et al. | |
| 5,734,417 A | 3/1998 | Yamamoto et al. | |
| 5,745,225 A | 4/1998 | Watanabe et al. | |
| 5,793,993 A | 8/1998 | Broedner et al. | |
| 5,894,123 A | 4/1999 | Ohtomo et al. | |
| 5,898,490 A | 4/1999 | Ohtomo et al. | |
| 5,933,267 A | 8/1999 | Ishizuka | |
| 5,936,721 A | 8/1999 | Ohtomo et al. | |
| 5,940,181 A | 8/1999 | Tsubono et al. | |
| 5,988,862 A | 11/1999 | Kacyra et al. | |
| 6,040,898 A | 3/2000 | Mrosik et al. | |
| 6,069,700 A | 5/2000 | Rudnick et al. | |
| 6,077,306 A | 6/2000 | Metzger et al. | |
| 6,149,112 A | 11/2000 | Thieltges | |
| 6,349,249 B1 * | 2/2002 | Cunningham | 701/28 |
| 6,445,446 B1 | 9/2002 | Kumagai et al. | |
| 6,480,270 B1 | 11/2002 | Studnicka et al. | |
| 6,483,106 B1 | 11/2002 | Ohtomo et al. | |
| 6,504,602 B1 | 1/2003 | Hinderling | |
| 6,512,575 B1 | 1/2003 | Marchi | |
| 6,650,402 B2 | 11/2003 | Sullivan et al. | |
| 6,675,122 B1 | 1/2004 | Markendorf et al. | |
| 6,710,859 B2 | 3/2004 | Shirai et al. | |
| 6,750,873 B1 | 6/2004 | Bernardini et al. | |
| 6,825,923 B2 | 11/2004 | Hamar et al. | |
| 6,856,381 B2 | 2/2005 | Christoph | |
| 6,917,415 B2 | 7/2005 | Gogolla et al. | |
| 6,965,843 B2 | 11/2005 | Raab et al. | |
| 7,029,126 B2 | 4/2006 | Tang | |
| 7,076,420 B1 | 7/2006 | Snyder et al. | |
| 7,127,822 B2 | 10/2006 | Kumagai et al. | |
| 7,140,213 B2 | 11/2006 | Feucht et al. | |
| 7,190,465 B2 | 3/2007 | Froehlich et al. | |
| 7,193,690 B2 | 3/2007 | Ossig et al. | |
| 7,285,793 B2 | 10/2007 | Husted | |
| 7,352,446 B2 | 4/2008 | Bridges et al. | |
| 7,430,068 B2 | 9/2008 | Becker et al. | |
| 7,541,830 B2 | 6/2009 | Fahrbach et al. | |
| 7,659,995 B2 | 2/2010 | Knighton et al. | |
| 7,733,544 B2 | 6/2010 | Becker et al. | |
| 7,798,453 B2 | 9/2010 | Maningo et al. | |
| 7,834,985 B2 | 11/2010 | Morcom | |
| 7,847,922 B2 | 12/2010 | Gittinger et al. | |
| 7,869,005 B2 | 1/2011 | Ossig et al. | |
| 7,900,714 B2 | 3/2011 | Milbourne et al. | |
| 7,935,928 B2 | 5/2011 | Serger et al. | |
| 7,994,465 B1 | 8/2011 | Bamji et al. | |
| 7,995,834 B1 | 8/2011 | Knighton et al. | |
| 8,020,657 B2 | 9/2011 | Allard et al. | |
| 8,117,668 B2 | 2/2012 | Crampton et al. | |
| 8,152,071 B2 | 4/2012 | Doherty et al. | |
| 8,269,984 B2 | 9/2012 | Hinderling et al. | |
| 8,310,653 B2 | 11/2012 | Ogawa et al. | |
| 8,384,914 B2 * | 2/2013 | Becker et al. | 356/614 |
| 2002/0059042 A1 | 5/2002 | Kacyra et al. | |
| 2002/0143506 A1 | 10/2002 | D'Aligny et al. | |
| 2002/0149694 A1 | 10/2002 | Seo | |
| 2002/0176097 A1 | 11/2002 | Rodgers | |
| 2003/0043386 A1 | 3/2003 | Froehgl et al. | |
| 2003/0090646 A1 | 5/2003 | Riegl et al. | |
| 2003/0137449 A1 | 7/2003 | Vashisth et al. | |
| 2003/0179361 A1 | 9/2003 | Ohtomo et al. | |
| 2004/0004727 A1 | 1/2004 | Yanagisawa et al. | |
| 2004/0027554 A1 | 2/2004 | Ishinabe et al. | |
| 2004/0135990 A1 | 7/2004 | Ohtomo et al. | |
| 2004/0179570 A1 | 9/2004 | Vitruk et al. | |
| 2004/0221790 A1 | 11/2004 | Sinclair et al. | |
| 2004/0246462 A1 | 12/2004 | Kaneko et al. | |
| 2005/0046823 A1 | 3/2005 | Ando et al. | |
| 2005/0111514 A1 | 5/2005 | Matsumoto et al. | |
| 2005/0141052 A1 | 6/2005 | Becker et al. | |
| 2005/0172503 A1 | 8/2005 | Kumagai et al. | |
| 2005/0190384 A1 | 9/2005 | Persi et al. | |
| 2006/0061566 A1 | 3/2006 | Verma et al. | |
| 2006/0088044 A1 | 4/2006 | Hammerl | |
| 2006/0109536 A1 | 5/2006 | Mettenleiter et al. | |
| 2006/0193521 A1 | 8/2006 | England, III et al. | |
| 2006/0241791 A1 | 10/2006 | Pokorny et al. | |
| 2006/0245717 A1 | 11/2006 | Ossig et al. | |
| 2007/0058154 A1 | 3/2007 | Reichert et al. | |
| 2007/0064976 A1 | 3/2007 | England, III | |
| 2007/0118269 A1 | 5/2007 | Gibson et al. | |
| 2007/0122250 A1 | 5/2007 | Mullner | |
| 2007/0150111 A1 | 6/2007 | Wu et al. | |
| 2007/0171394 A1 | 7/2007 | Steiner et al. | |
| 2007/0181685 A1 | 8/2007 | Zhu et al. | |
| 2007/0229929 A1 | 10/2007 | Soreide et al. | |
| 2008/0052808 A1 | 3/2008 | Leick et al. | |
| 2008/0075326 A1 | 3/2008 | Otani et al. | |
| 2008/0154538 A1 | 6/2008 | Stathis | |
| 2008/0273758 A1 | 11/2008 | Fuchs et al. | |
| 2008/0309546 A1 | 12/2008 | Wakayama et al. | |
| 2009/0046752 A1 | 2/2009 | Bueche et al. | |
| 2009/0051938 A1 | 2/2009 | Miousset et al. | |
| 2009/0095047 A1 | 4/2009 | Patel et al. | |
| 2009/0100949 A1 | 4/2009 | Shirai et al. | |
| 2009/0133494 A1 | 5/2009 | Van Dam et al. | |
| 2009/0161091 A1 | 6/2009 | Yamamoto | |
| 2009/0323742 A1 | 12/2009 | Kumano | |
| 2010/0030421 A1 | 2/2010 | Yoshimura et al. | |
| 2010/0049891 A1 | 2/2010 | Hartwich et al. | |
| 2010/0134596 A1 | 6/2010 | Becker | |
| 2010/0195086 A1 | 8/2010 | Ossig et al. | |
| 2011/0025905 A1 | 2/2011 | Tanaka | |
| 2011/0066781 A1 | 3/2011 | Debelak et al. | |
| 2012/0035798 A1 * | 2/2012 | Barfoot et al. | 701/25 |
| 2012/0046820 A1 | 2/2012 | Allard et al. | |
| 2012/0154786 A1 | 6/2012 | Gosch et al. | |
| 2012/0169876 A1 | 7/2012 | Reichert et al. | |

FOREIGN PATENT DOCUMENTS

| | | |
|---|---|---|
| CN | 1735789 | 2/2006 |
| CN | 1838102 A | 9/2006 |
| DE | 2216765 A1 | 4/1972 |
| DE | 3227980 A1 | 5/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 19601875 A1 | 7/1997 |
| DE | 19607345 A1 | 8/1997 |
| DE | 19811550 A1 | 9/1999 |
| DE | 19850118 A1 | 5/2000 |
| DE | 19928958 A1 | 11/2000 |
| DE | 20208077 U1 | 5/2002 |
| DE | 10137241 A1 | 9/2002 |
| DE | 10232028 | 2/2004 |
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10361870 A | 7/2005 |
| DE | 102004015111 A1 | 10/2005 |
| DE | 102004028090 A1 | 12/2005 |
| DE | 202006005643 U1 | 8/2006 |
| DE | 102005056265 A1 | 5/2007 |

(56) References Cited

FOREIGN PATENT DOCUMENTS

| | | |
|---|---|---|
| DE | 102006053611 A1 | 5/2007 |
| DE | 102006024534 A1 | 11/2007 |
| DE | 102008014274 A1 | 8/2009 |
| DE | 102009035336 B3 | 11/2010 |
| DE | 102010032726 B3 | 11/2011 |
| DE | 102010032725 A1 | 1/2012 |
| DE | 202011051975 U1 | 2/2013 |
| DE | 102012107544 B3 | 5/2013 |
| EP | 0667549 A2 | 8/1995 |
| EP | 0727642 A1 | 8/1996 |
| EP | 0838696 A1 | 4/1998 |
| EP | 0949524 A1 | 10/1999 |
| EP | 1056987 A1 | 6/2000 |
| EP | 1310764 A2 | 5/2003 |
| EP | 1342989 A2 | 9/2003 |
| EP | 1347267 A1 | 9/2003 |
| EP | 1528410 A1 | 5/2005 |
| GB | 1112941 | 5/1968 |
| GB | 2222695 A | 3/1990 |
| GB | 2336493 A | 10/1999 |
| GB | 2388661 A | 11/2003 |
| GB | 2447258 A | 9/2008 |
| JP | H04115108 A | 4/1992 |
| JP | H04267214 A | 9/1992 |
| JP | H0572477 A | 3/1993 |
| JP | 07128051 A | 5/1995 |
| JP | H07229963 A | 8/1995 |
| JP | 0821714 A | 1/1996 |
| JP | H0815413 A | 1/1996 |
| JP | 2000121724 A | 4/2000 |
| JP | 2000249546 A | 9/2000 |
| JP | 2001337278 A | 12/2001 |
| JP | 2003156330 A | 5/2003 |
| JP | 2004109106 A | 4/2004 |
| JP | 2004245832 A | 9/2004 |
| JP | 2005069700 A | 3/2005 |
| JP | 2007178943 A | 7/2007 |
| JP | 2008076303 A | 4/2008 |
| JP | 2008082707 A | 4/2008 |
| JP | 2008096123 A | 4/2008 |
| JP | 2008107286 A | 5/2008 |
| JP | 2009541758 A | 11/2009 |
| JP | 2010169405 A | 8/2010 |
| WO | 8905512 | 6/1989 |
| WO | 9711399 | 3/1997 |
| WO | 0020880 A2 | 4/2000 |
| WO | 0026612 | 5/2000 |
| WO | 0063645 | 10/2000 |
| WO | 0063681 A2 | 10/2000 |
| WO | 02084327 A2 | 10/2002 |
| WO | 2005008271 A2 | 1/2005 |
| WO | 2005059473 A2 | 6/2005 |
| WO | 2006000552 A1 | 1/2006 |
| WO | 2006053837 A1 | 5/2006 |
| WO | 2007012198 A1 | 2/2007 |
| WO | 2007051972 A1 | 5/2007 |
| WO | 2007087198 A1 | 8/2007 |
| WO | 2008019856 A1 | 2/2008 |
| WO | 2008048424 A2 | 4/2008 |
| WO | 2008068791 A1 | 6/2008 |
| WO | 2009053085 A1 | 4/2009 |
| WO | 2009095384 A2 | 8/2009 |
| WO | 2009123278 A1 | 10/2009 |
| WO | 2010108644 A1 | 9/2010 |
| WO | 2011021103 A1 | 2/2011 |
| WO | 2012061122 A1 | 5/2012 |
| WO | 2012103525 A2 | 8/2012 |

OTHER PUBLICATIONS

International Preliminary Report on Patentability for International Application Serial No. PCT/EP2011/003262. International filing date Jul. 1, 2011. Date of Issuance Jan. 29, 2013.

International Preliminary Report on Patentability for International Application Serial No. PCT/EP2011/003263. International filing date Jul. 1, 2011. Date of Issuance Jan. 29, 2013.

International Preliminary Report on Patentability for International Application Serial No. PCT/EP2011/003264. International filing date Jul. 1, 2011. Date of Issuance Jan. 29, 2013.

Akca, Devrim, Full Automated Registration of Laser Scanner Point Clouds, Institute of Geodesy and Photogrammetry, Swiss Federal Institute of Technology, Zuerich, Switzerland; Published Dec. 2003.

First Office Action and Search Report with English Translation for Chinese Patent Application No. 201080003456.3; Issue Date Jan. 17, 2013.

International Search Report of the International Searching Authority for Application No. PCT/US20121075178; Date of Mailing Apr. 9, 2013.

"Scanner Basis Configuration for Riegl VQ-250", Riegl Company Webpage, Feb. 16, 2011, XP002693900, Retrieved from the internet: URL:http://www.riegl.com/uploads/tx_pxpriegldownloads/30_SystemConfiguration_VQ-250_02-11_16-02-2011.pdf [retrieved on Mar. 15, 2013] the whole document.

Written Opinion of the International Searching Authority for Application No. PCT/US2012/075178; Date of Mailing Apr. 9, 2013.

Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Conference on Intelligent Robots and Systems], New York, NY: IEEE, US, vol. 1, Oct. 27, 2003; pp. 188-193, XP010672337, DOI:10.1109/IROS.2003.1250626; ISBN: 978-0-7803-7860-5, p. 189; Figure 1.

Chinese Office Action Dated Jun. 2, 2010 with English Translation of the Text for Application No. 2006800540959.

Chinese Publication No. CN 1445509, published Oct. 1, 2003— English Abstract Not Available; EP Equivalent 1347267.

Ingensand, H., Dr., "Introduction to Geodetic Metrology", "Einfuhrung in die Geodatische Messtechnik", Federal Institute of Technology Zurich, Edition 2004, p. 16.

FARO Laserscanner LS, Presentation Forensic Package, Policeschool of Hessen, Wiesbaden, Germany, Dec. 14, 2005; FARO Technologies, Copyright 2008.

FARO Laser Scanner LS, Recording Reality's Digital Fingerprint, The Measure of Success, Copyright 2005.

Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008.

Howard, et al., "Virtual Environments for Scene of Crime Reconstruction and Analysis", Advanced Interfaces Group, Department of Computer Science, University of Manchester, Manchester, UK, Feb. 28, 2000.

International Preliminary Report on Patentability and Written Opinion for PCT/EP2009/050887; Date of Issue Sep. 7, 2010.

International Preliminary Report on Patentability and Written Opinion for International Patent Application PCT/IB2010/002226; Date of Issuance Jan. 24, 2012.

International Preliminary Report on Patentability and Written Opinion for PCT/EP2004/014605; Date of Issue Aug. 29, 2006.

iQsun Laserscanner Brochure, 2 Pages, Apr. 2005.

14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK.

Akca, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656666.

Bornaz, L., et al., Multiple Scan Registration in Lidar Close-Range Applications, The International Archives of the Photogrammetry, Remote Sensing and Spatial Information Sciences, vol. XXXIV, Part 5/W12, Jul. 2003, pp. 72-77, XP002590306.

Bouvet, D., et al., "Precise 3-D Localization by Automatic Laser Theodolite and Odometer for Civil-Engineering Machines", Proceedings of the 2001 IEEE International Conference on Robotics and (56) References Cited

OTHER PUBLICATIONS

Automation. ICRA 2001. Seoul, Korea, May 21-26, 2001; IEEE, US., vol. 2, May 21, 2001, pp. 2045-2050, XP010550445, DOI: 10.1109/ROBOT.2001.932908 ISBN: 978-0-7803-6576-6, the whole document.
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998, Nov. 3, 1998 pp. 343-354, XP002587995, Proceedings of the SPIE.
Godin, G., et al., A Method for the Registration of Attributed Range Images, Copyright 2001, [Retrieved on Jan. 18, 2010 at 03:29 from IEEE Xplore].
International Preliminary Report and Written Opinion for International Application No. PCT/EP2007/005789; Date of Mailing Oct. 30, 2007.
International Preliminary Report on Patentability and Written Opinion for PCT/IB2010/002216; Date of Issuance Jan. 24, 2012.
International Preliminary Report on Patentability and Written Opinion for PCT/EP2010/001779; Date of Issuance Sep. 27, 2011.
International Preliminary Report on Patentability and Written Opinion for PCT/IB2010/002258; Date of Issuance Feb. 21, 2012.
International Preliminary Report on Patentability and Written Opinion for PCT/EP2010/006866; Date of Issuance May 22, 2012.
International Preliminary Report on Patentability and Written Opinion for PCT/EP2010/006867; Date of Issuance May 22, 2012.
International Preliminary Report on Patentability and Written Opinion for PCT/EP2010/001780; Date of Issuance Sep. 27, 2011.
International Preliminary Report on Patentability and Written Opinion for PCT/EP2010/001781; Date of Issuance Sep. 27, 2011.
International Preliminary Report on Patentability and Written Opinion for PCT/EP2010/006868; Date of Issuance May 22, 2012.
International Search Report and Written Opinion for PCT/EP2009/009174; Date of Mailing May 25, 2010.
International Search Report of the International Searching Authority for PCT/IB2010/002216; Date of Mailing Feb. 3, 2011.
International Search Report of the International Searching Authority for PCT/EP2010/006867; Date of Mailing Mar. 18, 2011.
International Search Report of the International Searching Authority for PCT/EP2010/001779; Date of Mailing Jul. 20, 2010.
International Search Report of the International Searching Authority for PCT/EP2010/001780; Date of Mailing Jul. 23, 2010.
International Search Report of the International Searching Authority for PCT/IB2010/002258; Date of Mailing Jan. 28, 2011.
International Search Report of the International Searching Authority for Application No. PCT/EP2011/003263; Date of Mailing Oct. 19, 2011.
International Search Report of the International Searching Authority for Application No. PCT/EP2011/003264; Date of Mailing Oct. 19, 2011.
Jasiobedzki, Piotr, "Laser Eye—A New 3D Sensor for Active Vision", SPIE—Sensor Fusion VI, vol. 2059, Sep. 7, 1993, pp. 316-321, XP00262856, Boston, U.S.A., Retrieved from the Internet: URL:http://scitation.aip.org/getpdf/serylet/GetPDFServlet?filetype=pdf&id=PSISDG002059000001000316000001&idtype=cvips&doi=10.117/12.150236&prog=normal>[retrieved on Mar. 8. 2011] the whole document.
Umeda, K., et al., Registration of Range and Color Images Using Gradient Constraints and Ran Intensity Images, Proceedings of the 17th International Conference onPatern Recognition (ICPR'04), Copyright 2010 IEEE. [Retrieved online Jan. 28, 2010—IEEE Xplore].
Written Opinion of the International Searching Authority for International Patent Application PCT/EP20101006867; mailing date Mar. 18, 2011.
Written Opinion of the International Searching Authority for Application No. PCT1EP2006/003010; Date of Mailing Dec. 11, 2006.
First Chinese Office Action for Application No. 201080003467.1; Office Action Issue Date Feb. 5, 2013; (translated).

Elstrom, M.D., Stereo-Based Registration of LADAR and Color Imagery, Part of SPIE Conference on Intelligent Robots and Computer Vision XVII: Algorithms, Techniques, and Active Vision, Boston, MA, Nov. 1998, SPIE vol. 3522, 0277-786X/98; [Retrieved on-line], Downloaded From: http://proceedings.spiedigitallibrary.org/on Jan. 26, 2013.
Merriam-Webster (m-w.com), "Interface". 2012. http://www.merriam-webstercom/dictionary/interface.
Merriam-Webster (m-w.com), "Traverse". 2012. http://www.merriam-webster.com/dictionary/traverse.
Merriam-Webster (m-w.com), "Parts". 2012. http://www.merriam-webstercom/dictionary/parts.
Chinese Notification of First Office Action for Chinese Application No. 201080003463.3; Issued Oct. 30, 2012 (translated).
GB Examination Report dated Mar. 27, 2013 for GB Application No. GB1303390.7.
GB Examination Report dated Mar. 27, 2013 for GB Application No. GB1303382.4.
International Preliminary Report on Patentability and Written Opinion for PCT/EP2009/050888; Date of Issuance Sep. 7, 2010.
International Preliminary Report on Patentability and Written Opinion for PCT/EP2009/009174; Date of Issuance Aug. 16, 2011.
International Search Report of the International Searching Authority for PCT/EP2007/005789; Date of Mailing Oct. 30, 2007.
International Search Report of the International Searching Authority for PCT/IB2010/002226; Date of Mailing Dec. 13, 2010.
International Search Report of the International Searching Authority for PCT/EP2004/014605; Date of Mailing Apr. 15, 2005.
International Search Report of the International Searching Authority for PCT/EP2006/003010; Date of Mailing Nov. 12, 2006.
International Search Report of the International Searching Authority for PCT/EP2010/001781; Date of Mailing Jul. 22, 2010.
International Search Report of the International Searching Authority for Application No. PCT/EP2011/001662; Date of Mailing May 26, 2011.
International Search Report of the International Searching Authority for Application No. PCT/EP2011/003261; Date of Mailing Oct. 17, 2011.
International Search Report of the International Searching Authority for PCT/EP2009/050888; Date of Mailing Sep. 15, 2009.
International Search Report of the International Searching Authority for PCT/EP2010/006866; Date of Mailing Mar. 14, 2011.
International Search Report of the International Searching Authority for PCT/EP20101006868; Date of Mailing Mar. 14, 2011.
International Search Report of the International Searching Authority for PCT/EP20091050887; Date of Mailing May 14, 2009.
Leica Geosystems TruStory Forensic Analysis by Albuquerque Police Department, 2006.
Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [retrieved on Oct. 5, 2011] the whole document.
Langford, et al., "Practical Skills in Forensic Science", Pearson Education Limited, Essex, England, First Published 2005, Forensic Chemistry.
Huebner, S.F., "Sniper Shooting Tecnhique", "Scharfschutzen Schiebtechnik", Copyright by C.A. Civil Arms Verlag GmbH, Lichtenwald 1989, Alle Rechte vorbehalten, pp. 11-17.
Se, et al., "Instant Scene Modeler for Crime Scene Reconstruction", MDA, Space Missions, Ontario, Canada, Copyright 2005, IEEE.
The Scene, Journal of the Association for Crime Scene Reconstruction, Apr.-Jun. 2006, vol. 12, Issue 2.
Williams, J.A., et al., Evaluation of a Novel Multiple Point Set Registration Algorithm, Copyright 2000, [Retrieved on Jan. 18, 2010 at 04:10 from IEEE Xplore].
Written Opinion of the International Searching Authority for Application No. PCT1EP2011/001662; Date of Mailing May 26, 2011.
Second Office Action with English Translation for Chinese Patent Application No. 201080003466.7; Issue Date Jul. 19, 2013.
Chinese Office Action for Chinese Application Serial No. 201080047516-1; Date of Issue Apr. 1, 2013.

(56) References Cited

OTHER PUBLICATIONS

Leica Geosystems, FBI Crime Scene Case Study, Cited in Opposition of EP Application No. 07785873.6 in Oral Proceedings held on Jun. 27, 2013, Munchen, Germany; D13, p. 5 of Summons, Tony Grissim, Feb. 2006.
Germany Office Action for DE Application No. 10 2012 107 544.1; Issued Jan. 2, 2013.
GB Examination Report dated Aug. 7, 2013 for GB Application No. GB1303390.7.
GB Examination Report dated Aug. 15, 2013 for GB Application No. GB 1303382.4.
GB Examination Report dated Jun. 19, 2013 for GB Application No. GB1202398.2.
Japanese Office Action for JP Application Serial No. 2013-520990; dated Jul. 2, 2013.
International Search Report of the International Searching Authority for Application No. PCT/EP2011/003262; Date of Mailing Sep. 30, 2011.
Japanese Office Action for Application Serial No. 2013-520987; Date of Mailing Jul. 2, 2013.
Japanese Office Action for Application Serial No. 2013-520989; Date of Mailing Jul. 2, 2013.
First Chinese Office Action for Chinese Patent Application No. 2013082200801190; Dated Aug. 27, 2013.
Second German Office Action for DE Application Serial No. 10 2009 015 922.3; Dated Dec. 2, 2013.
German Office Acton for DE Application No. 102013102.554.4; Dated Jan. 9, 2014.
GB Exam and Search Report for Application No. GB1314371.4; Dated Nov. 22, 2013.
Horn, B.K.P., Closed-Form Solution of Absolute Orientation Using Unit Quaternions, J. Opt. Soc. Am. A., vol. 4., No. 4, Apr. 1987, pp. 629-642, ISSN 0740-3232.
Second JP Office Action for JP Patent Application Serial No. 2012-534590; Date of Mailing Nov. 12, 2013.
Japanese Office Action for JP Patent Application Serial No. 2012-501174; Dated Oct. 29, 2013.
Japanese Office Action for Japanese Patent Application No. 2012501176; Dated Aug. 27, 2013.
Japanese Office Action for Japanese Patent Application No. 2012-534588; Date of Mailing Sep. 17, 2013.

\* cited by examiner

DEVICE FOR OPTICALLY SCANNING AND MEASURING AN ENVIRONMENT

CROSS-REFERENCE TO RELATED APPLICATIONS

The present application is a National Stage Application of PCT Application No. PCT/EP2011/003264, filed on Jul. 1, 2011, which claims the benefit of U.S. Provisional Patent Application No. 61/384,422, filed on Sep. 20, 2010, and of pending German Patent Application No. DE 10 2010 033 561.4, filed on Jul. 29, 2010, and which are hereby incorporated by reference.

BACKGROUND OF THE INVENTION

The invention relates to a device for optically scanning and measuring an environment.

U.S. Pat. No. 7,193,690 describes a device in which a laser scanner is mounted on a tripod. For registering a scene through use of several scans, the laser scanner together with the tripod is taken to a new location after a scan.

SUMMARY OF THE INVENTION

Embodiments of the present invention are based on improving a device of the type mentioned hereinabove.

According to an embodiment of the present invention, the use of a manually movable trolley facilitates the change of location of the laser scanner compared to the transport of the tripod. It is furthermore less expensive than an automotive trolley. The laser scanner can remain mounted on the trolley during the scan, so that no additional stand is necessary. A positioning of the laser scanner vertically above a position of the trolley during the resting state provides for a relatively safe stand and a defined orientation.

When using the notions "horizontal" and "vertical" with respect to the geometry of the laser scanner and the trolley, it is assumed that the direction of the weight corresponds to the vertical, i.e., the trolley is on a horizontal plane. The trolley can, however, also be slightly inclined, for example, up to 15° towards the horizontal and/or the vertical (i.e., the axes of rotation of measuring head and mirror have a corresponding inclination), without problems arising during the realization of the scan or its evaluation.

Basically, there are two possible operating modes of the laser scanner, during which the trolley is helpful. With the first operating mode, a complete scene can be registered with several scans from different locations, wherein the laser scanner carries out the scan at every location by means of the rotating measuring head and the rotating mirror. The trolley then serves only to change location. With the second operating mode (helical scan), the measuring head can remain idle during the movement of the trolley, while only the mirror rotates to perform the scan. The trolley is then moved along a selected path during the measurement and records changes of position, for example, by encoders in the wheels. This provides a method for relatively quickly generating overview data along the specified path. The precision of movement can be improved by a higher number of wheels and consequently a more stable and more uniform movement of the trolley. Compared to a motor-driven trolley, the manually movable trolley is relatively less expensive.

BRIEF DESCRIPTION OF THE DRAWINGS

The invention is explained in more detail below on the basis of an exemplary embodiment illustrated in the drawing, in which.

DETAILED DESCRIPTION OF THE INVENTION

Figure 5:
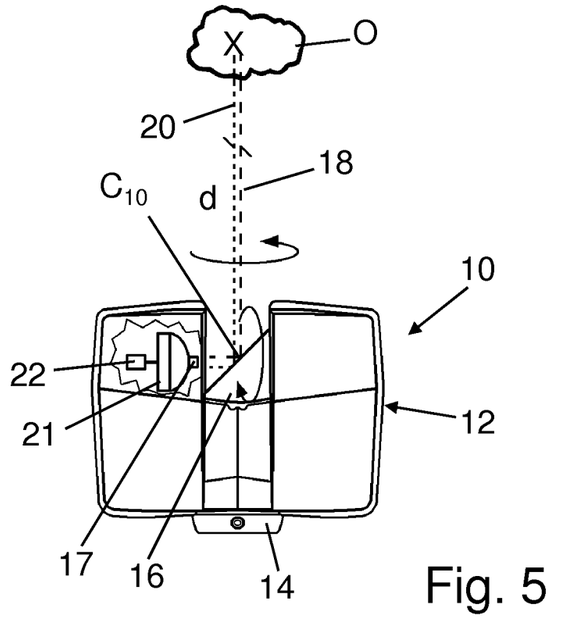
FIG. 5 is a schematic, partially sectional view of the laser scanner during operation.

Referring to the Figures, a laser scanner 10 is provided as part of a device for optically scanning and measuring an environment of the laser scanner 10. The laser scanner 10 has a measuring head 12 and a base 14. The measuring head 12 is mounted on the base 14 as a unit that can be rotated about a vertical axis. The measuring head 12 has a rotary mirror 16, which can be rotated about a horizontal axis. The intersection point of the two rotational axes is designated center $C_{10}$ of the laser scanner 10.

The measuring head 12 is further provided with a light emitter 17 for emitting an emission light beam 18. The emission light beam 18 is a laser beam in the range of approx. 300 to 1600 nm wave length, for example, 790 nm, 905 nm or less than 400 nm. However, other electro-magnetic waves having, for example, a greater wave length can be used. The emission light beam 18 is amplitude-modulated with a modulation signal. The emission light beam 18 is emitted by the light emitter 17 onto the rotary mirror 16, where it is deflected and emitted to the environment. A reception light beam 20 which is reflected in the environment by an object 0 or scattered otherwise, is captured again by the rotary mirror 16, deflected and directed onto a light receiver 21. The direction of the emission light beam 18 and of the reception light beam 20 results from the angular positions of the rotary mirror 16 and the measuring head 12, which depend on the positions of their corresponding rotary drives which, in turn, are measured by one encoder each.

A control and evaluation unit 22 has a data connection to the light emitter 17 and to the light receiver 21 in measuring head 12, whereby parts of the unit 22 can be arranged also outside the measuring head 12, for example, a computer connected to the base 14. The control and evaluation unit 22 is configured to determine, for a multitude of measuring points X, the distance d between the laser scanner 10 and the illuminated point at object O, from the propagation time of emission light beam 18 and reception light beam 20. For this purpose, the phase shift between the two light beams 18 and 20 can be determined and evaluated.

Scanning takes place along a circle by the relatively quick rotation of the rotary mirror 16. By virtue of the relatively slow rotation of the measuring head 12 relative to the base 14, the whole space is scanned step by step, for example, by the circles. The entity of measuring points X of such a measurement is designated scan. For such a scan, the center $C_{10}$ of the laser scanner 10 defines the origin of the local stationary reference system. The base 14 rests in this local stationary reference system.

In addition to the distance d to the center $C_{10}$ of the laser scanner 10, each measuring point X comprises a brightness information which is determined by the control and evaluation unit 22 as well. The brightness value is a gray-scale value which is determined, for example, by integration of the band-pass-filtered and amplified signal of the light receiver 21 over a measuring period which is attributed to the measuring point X. Pictures can optionally be generated by a color camera, through which colors (R, G, B) can be attributed as value to the measuring points.

Figure 1:
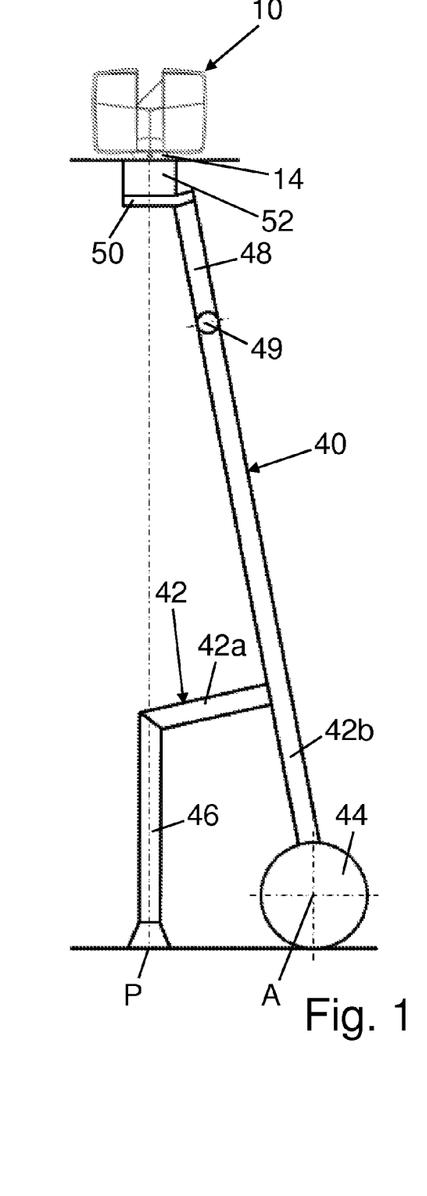
FIG. 1 is a lateral view of the trolley with the mounted laser scanner.
Figure 2:
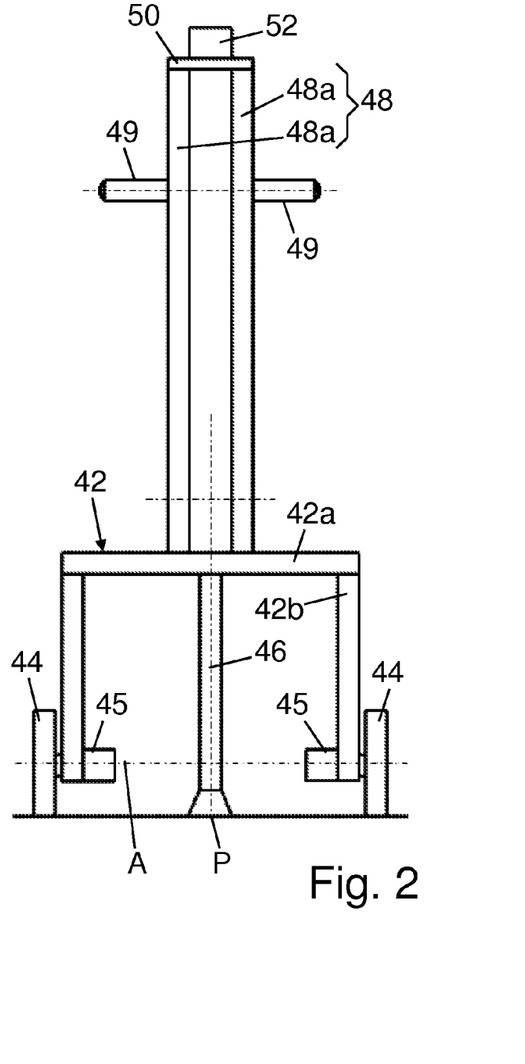
FIG. 2 is a further lateral view of the trolley from a direction which is by 90° displaced with respect to FIG. 1.

To register a scene from different directions, several scans are generated from different locations and then registered with respect to a joint coordinate system of the scene. The laser scanner 10 must change its location for this purpose, thus moving each time the center $C_{10}$ of the laser scanner 10 within the joint coordinate system. To simply change the location, the device for optically scanning and measuring an environment of the laser scanner 10 also comprises a trolley 40 in addition to the above-described laser scanner 10 itself, onto which the laser scanner 10 is continuously mounted.

The manually movable trolley 40 has a carriage 42 with at least two wheels 44 which rotate independently of one another about a common, imaginary or physical, axis A and each of which is provided with an encoder 45, and a support foot 46 which, when the trolley 40 is not moved, define a support at three points. The directions used refer to the ideally horizontal plane of this support, wherein the trolley 40, for being moved, is inclined with respect to its resting state. The point at which the support foot 46 supports the trolley 40 at the ground is denominated stand P. Instead of the support foot 46, also a third wheel may be provided which is displaced with respect to the axis A of the two other wheels 44 and which is steerable. In embodiments of the present invention, the carriage has a traverse 42a, from each of the two opposing ends of which a bearing 42b protrudes vertically downward, which bears one of the two wheels 44 or their axis A, and at the third end of which the support foot 46 protrudes obliquely downward.

Furthermore, an arm 48 protrudes upward from the carriage 42, in embodiments of the present invention two parallel square profiles 48a which are connected with one another, and which are fixed to the traverse 42a. On both sides of the arm 48 handles 49 protrude, that is one handle 49 from each of the two square profiles 48a, for example, parallel to the axis A of the wheels 44. At the upper end of the arm 48, a mounting plate 50 is fixed which, in embodiments of the present invention, has a triangular shape with the two square profiles 48a screwed in two of the three corners of the mounting plate. The mounting plate 50 bears a mounting device 52, in embodiments of the present invention a cylindrical or square block with a rotatable mounting screw 52a, said mounting device 52 being screwed to the mounting plate 50 within the area of the third corner. The mounting plate 50 has a kink, so that the mounting device 52 is inclined obliquely to the support 48. The dimensions of the arm 48 and of the traverse 42 and the inclination angles between the support foot 46 and the traverse 42a and between the mounting device 52 and the arm 48 are selected such that the mounting device 52 is arranged exactly in the extension of the support foot 46, wherein, in the resting state of the trolley 40, the mounting device 52 is aligned exactly vertically above the stand P, and the upper side of the mounting device 50 is aligned horizontally.

Figure 3:
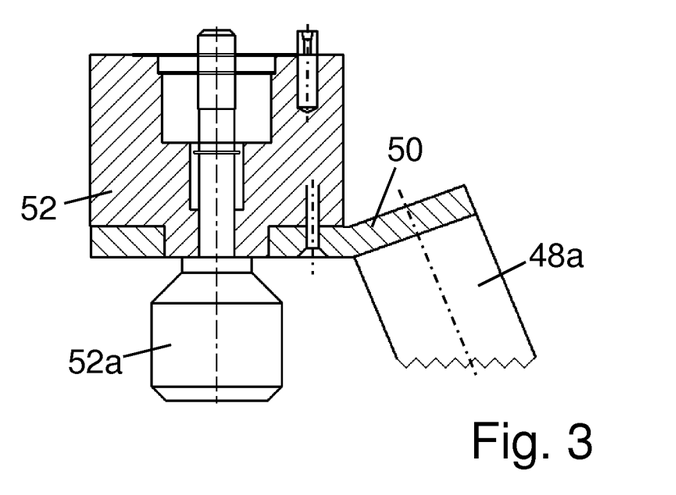
FIG. 3 is a section trough the mounting device.
Figure 4:
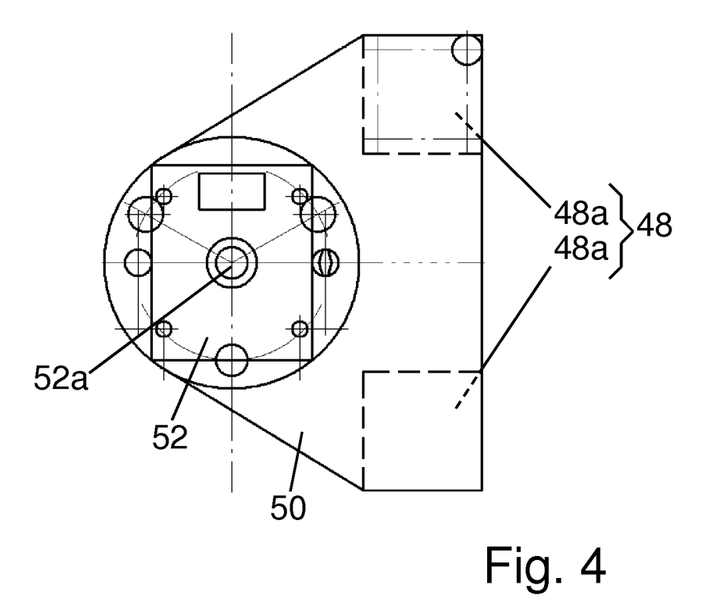
FIG. 4 is a plain view of the mounting device.

The laser scanner 10 with its base 14 is arranged on the upper side of the mounting device 52 of the trolley 40 and fixed to the mounting device 52, in embodiments of the present invention it is screwed by the mounting screw 52a, so that the arm 48 bears the laser scanner 10. During a scan the trolley 40 is in its resting state, i.e., the laser scanner 10 ideally is aligned horizontally. Between two scans for a scene, the trolley 40 with the laser scanner 10 can be moved manually, the trolley 40, by the handles 49, being inclined around the axis A of the wheels 44 so that the support foot 46 detaches from the ground, and the center $C_{10}$ of the laser scanner 10 reaches the vertical through the axis A of the wheels 44 or passes this vertical and the trolley 40 is then pushed or drawn in this inclined moving state by means of the handles 49.

Typical dimensions are, for example, that the center $C_{10}$ of the laser scanner 10 is 1600 mm above the stand P, the wheels 44 are spaced apart from each other by 600 mm, the support foot 46 between the traverse 42a and the ground is 400 mm long, and the inclination angle between the arm 48 and the vertical line connecting mounting device 52 and stand P is 12° in the resting state. The square profiles 48a can measure 40 mm×40 mm, and the mounting device 52 with the mounting plate 50 can be 64 mm high.

The trolley 40 has a path measuring device which, in the exemplary embodiment, comprises the two encoders 45 at the wheels 44 and a not illustrated connection from the encoders 45 to the laser scanner 10, particularly to the control and evaluation unit 22. Each of these two encoders 45 measures the rotation of the assigned wheel 44, that is its path as a function of time, so that the length of the path of every wheel 44 results directly, and the direction of the path of trolley 40 results from the combination of the information of the two wheels 44. Alternatively, an optical path measuring device is provided, which, for example, measures the optical flow.

With the first operating mode of the laser scanner 10 rotating measuring head 12, rotating mirror 16, resting trolley 40, for registering a scene by the path measuring device of the trolley 40, the change from one viewpoint to the next viewpoint can be pursued, facilitating registering of the single scans in the joint coordinate system. With the second operating mode of the laser scanner 10 resting measuring head 12, rotating mirror 16, moved trolley 40, with which the scan is generated during the movement of the trolley 40 with, more or less, the same inclination of the laser scanner, the data of the path measuring device of the trolley 40 go down in the scan as further coordinates. Compared to the first operating mode, the data of the path measuring device replace those of the encoder of measuring head 12.

The control and evaluation unit 22 can immediately evaluate the data of the path measuring device or include them into the scan for a later evaluation or record them separately, so that they can be synchronized with the data of the scan. The path measuring device can also have a control unit of its own, which separately records the data of the encoders 45 and transmits them later on to the control and evaluation unit 22.

A higher number of wheels, for example, an additional third wheel which can be steerable, or a total of four wheels, stabilizes the movement of the trolley 40, particularly during the second operating mode, during which by three wheels the inclination of the laser scanner 10 shall be maintained. Two encoders 45 at two wheels 44 which rotate independently of one another, are sufficient for the path measuring device. A higher number of wheels with additional encoders can, however, provide information for error correction.

The laser scanner 10 and/or the trolley 40 have different sensors, for example, thermometer, inclinometer, altimeter, compass, gyro compass, GPS, etc. which are connected to the control and evaluation unit 22. By such sensors, the operating conditions of the laser scanner 10, which are defined by certain parameters, for example, geometric orientation or temperature, are monitored. If one or several parameters have a drift, this is recognized by the assigned sensors and can be compensated by the control and evaluation unit 22. By such sensors, also a sudden change of operating conditions can be recognized, for example, a blow on the laser scanner 10 which changes its orientation, or a displacement of the laser scanner 10. If the extent of the change cannot be measured with sufficient precision, the scanning process must be interrupted or aborted. If the extent of the change of operating conditions can be roughly estimated, the measuring head 12 can be turned back by some angular degrees until there is an overlapping with the area which has been scanned before the sudden change, and the scanning process continues. The two different parts of the scan can be joined together by an evaluation of the overlapping area.

With the second operating mode, the data of said sensors refine the data of the path measuring device of the trolley 40. During the first operating mode of the laser scanner 10, the orientation of the laser scanner 10 with respect to the horizontal and to the vertical can be checked before the scanning process, by the inclinometers. The trolley 40 has adjusting possibilities, for example, a length adjustment of the support foot 46 or an adjustment of the inclination of mounting device 52, to adjust the orientation of the trolley 40 and/or of the laser scanner 10.

The invention claimed is:

1. Device for optically scanning and measuring and environment with a laser scanner, having a base and a measuring head which is rotatable relative to the base, with a light emitter, which emits an emission light beam, a light receiver which receives a reception light beam which is reflected by an object in the environment of the laser scanner or scattered otherwise, and a control and evaluation unit which, for a multitude of measuring points, determines at least the distance to the object, characterized in that the device has a manually movable trolley, on which the laser scanner is mounted by means of its base and which can be taken from a resting state to a moving state, wherein the trolley has a path measuring device for measuring its path and a carriage which is provided with at least two wheels, which are rotatable independently of one another, particularly about a common axis, wherein the path measuring device has at least two encoders, each of which is assigned to one of the at least two wheels;
   wherein the multitude of measuring points includes a first plurality of measuring points measured from a first location and a second plurality of measuring points measured from a second location; and
   wherein the control and evaluation unit is configured to translate the first plurality of measuring points and the second plurality of measuring points to a common coordinate frame of reference based at least in part on the path measured by the path measuring device.

2. Device according to claim 1, characterized in that the carriage is provided with a support foot or a third wheel which particularly is steerable, wherein supporting of the support foot or of the third wheel at the ground defines a stand.

3. Device according to claim 1, characterized in that the trolley has an arm which bears the laser scanner, wherein the arm particularly protrudes from the carriage.

4. Device according to claim 3, characterized in that the arm bears a mounting device, particularly on a mounting plate which is fixed to the arm, wherein the mounting device must be connected with the base of the laser scanner.

5. Device according to claims 4, characterized in that the mounting device, during the rest state of the trolley, is vertically above the stand.

6. Device according to claim 5, characterized in that the arm is inclined obliquely towards the line connecting the mounting device and the stand in the rest state of the trolley.

7. Device according to any of claims 4, characterized in that the mounting device, in the moving state of the trolley is vertically above the axis of the wheels or, while the trolley gets inclined from the rest state to the moving state, has passed the vertical through the axis of the wheels.

8. Device according to claim 1, characterized in that the trolley has adjusting possibilities for adjusting the alignment of the laser scanner and/or of the trolley.

9. A device for optically scanning and measuring and environment comprising:
   a laser scanner, having a base and a measuring head which is rotatable relative to the base about a first axis, the measuring head including a mirror rotatable about a second axis, the second axis substantially perpendicular to the first axis, a light emitter, which emits an emission light beam towards the mirror, a light receiver which receives a reception light beam from the mirror which is reflected by an object in the environment, and a control and evaluation unit which, for a multitude of measuring points, determines at least the distance to the object;
   a manually movable trolley, on which the laser scanner is mounted and which can be taken from a resting state to a moving state, the trolley having a carriage with at least two wheels that rotate independently about a common ax;
   a path measuring device coupled to the trolley and operably coupled to the control and evaluation unit, the path measuring device having at least two encoders, each of which is assigned to one of the at least two wheels
   wherein the control and evaluation unit is configured to translate a first plurality of measuring points from a first location and a second plurality of measuring points from a second location to a common coordinate frame in response to a signal from the path measuring device.

10. The device of claim 9 wherein the carriage is provided with a support foot.

11. The device of claim 10 wherein the trolley has an arm to which the laser scanner is mounted by a mounting device, and wherein the mounting device, during a rest state of the trolley, is positioned vertically above the stand.

12. The device of claim 9 wherein the control and evaluation unit is further configured to operate in a first mode of operation to acquire the first plurality of measuring points at both the first location and the second location by simultaneously rotating the measuring head about the first axis and the mirror about the second axis.

13. The device of claim 12 wherein the control and evaluation unit is further configured to operate in a second mode of operation wherein the first plurality of measuring points are acquired by rotating the mirror about the second axis in response to the device being moved from the first location to the second location.

* * * * *